United States Patent [19]

Ostrom et al.

[11] Patent Number: 4,729,514

[45] Date of Patent: * Mar. 8, 1988

[54] MEANS FOR SEEDING THROUGH A CENTER PIVOT IRRIGATION SYSTEM

[75] Inventors: Carl R. Ostrom, Omaha; John A. Chapman, Wahoo, both of Nebr.

[73] Assignee: Valmont Industries, Inc., Valley, Nebr.

[*] Notice: The portion of the term of this patent subsequent to Apr. 28, 2004 has been disclaimed.

[21] Appl. No.: 919,040

[22] Filed: Oct. 15, 1986

Related U.S. Application Data

[63] Continuation-in-part of Ser. No. 745,183, Jun. 17, 1985, Pat. No. 4,660,775.

[51] Int. Cl.⁴ .............................................. B05B 3/18
[52] U.S. Cl. ........................................ 239/727; 111/1; 222/133; 222/630; 239/310
[58] Field of Search ............... 239/727, 728, 310, 317, 239/325; 47/48.5; 111/1, 7.1, 10; 222/630, 133

[56] References Cited

U.S. PATENT DOCUMENTS

| | | |
|---|---|---|
| 952,607 | 3/1910 | Coplen . |
| 1,208,058 | 12/1916 | Warriner .......................... 222/133 |
| 1,324,508 | 12/1919 | Leopold ............................ 222/133 |
| 1,971,278 | 8/1934 | Schurmann ...................... 239/289 |
| 2,682,428 | 6/1954 | Roberts ............................. 239/311 |
| 2,746,621 | 5/1956 | McIntyre ............................. 111/1 |
| 2,754,622 | 7/1956 | Rohnert . |
| 2,892,593 | 6/1959 | Smeltzer . |
| 2,993,626 | 7/1961 | Gildersleeve . |
| 3,110,275 | 11/1963 | Bonney . |
| 3,149,588 | 9/1964 | Gatzke ................................. 111/1 |
| 3,247,812 | 4/1966 | Luciano .............................. 111/1 |
| 3,322,080 | 5/1967 | Gatzke ................................ 111/1 |
| 3,326,232 | 6/1967 | Stamps ............................... 239/1 |
| 3,410,490 | 11/1968 | Smith ................................. 239/727 |
| 3,616,769 | 11/1971 | Normand ............................ 111/6 |
| 3,648,631 | 3/1972 | Fiedler ................................ 111/6 |
| 3,648,930 | 3/1972 | Brown ................................ 239/156 |
| 3,653,550 | 4/1972 | Williams ........................... 222/136 |
| 3,713,404 | 1/1973 | Lavo ..................................... 111/1 |
| 3,742,877 | 7/1973 | Coffee ................................. 111/6 |
| 3,744,441 | 7/1973 | Smith ................................... 111/1 |
| 3,822,655 | 7/1974 | Benedict ............................. 111/1 |
| 3,844,481 | 10/1974 | Livingston ........................ 239/727 |
| 3,869,088 | 4/1975 | Dykmans ........................... 239/177 |
| 3,895,589 | 7/1975 | Garner ................................. 111/7 |
| 3,901,442 | 8/1975 | Chapman .......................... 239/728 |
| 3,922,977 | 12/1975 | Lavo ..................................... 111/1 |
| 3,933,309 | 1/1976 | Odegaard ........................... 239/171 |
| 4,145,980 | 3/1979 | Boots ................................... 111/1 |
| 4,181,241 | 1/1980 | Currah ............................... 221/211 |
| 4,186,671 | 2/1980 | Huang ................................ 111/2 |
| 4,224,882 | 9/1980 | Cruse .................................. 111/7 |
| 4,244,306 | 1/1981 | Peterson ............................. 111/7 |
| 4,266,489 | 5/1981 | Parramore ........................... 111/1 |
| 4,277,026 | 7/1981 | Garvey ............................... 239/127 |
| 4,352,463 | 10/1982 | Baker ................................. 239/663 |
| 4,356,934 | 11/1982 | Knake ................................. 221/96 |
| 4,397,421 | 8/1983 | Schraam ........................ 239/177 R |
| 4,660,775 | 4/1987 | Ostrom et al. ..................... 239/727 |

FOREIGN PATENT DOCUMENTS

| | | | |
|---|---|---|---|
| 105849 | 2/1898 | Fed. Rep. of Germany ...... | 222/133 |
| 953376 | 3/1964 | United Kingdom ................ | 47/48.5 |

*Primary Examiner*—Andres Kashnikow
*Assistant Examiner*—Michael J. Forman
*Attorney, Agent, or Firm*—Zarley, McKee, Thomte, Voorhees & Sease

[57] ABSTRACT

In this invention, a means is described for seeding through a self-propelled irrigation system. In one form of the invention, the seeds are metered into an auxiliary water line, supported on the main water line, and are sprinkled onto the ground by way of sequentially operated sprinklers. In another form of the invention, the seeds are metered directly into the main water line and are broadcast onto the ground by sequentially operated sprinklers.

20 Claims, 12 Drawing Figures

MEANS FOR SEEDING THROUGH A CENTER PIVOT IRRIGATION SYSTEM

CROSS-REFERENCE TO RELATED APPLICATION

This is a continuation-in-part patent application of U.S. Ser. No. 745,183 filed June 17, 1985, now U.S. Pat. No. 4,660,775 issued Apr. 28, 1987.

BACKGROUND OF THE INVENTION

Throughout history, seeds have been planted in many different ways. Perhaps the earliest method of seeding was the hand broadcasting of the seeds onto the ground. Another method of seeding in the past was to poke or create openings in the ground with the seeds being dropped into the openings and the ground then closed thereover. In recent years, seeds such as corn, milo, wheat, barley, oats, etc. have been planted or seeded by the "drilling" or drill press method. In the drill press method, the soil is normally first prepared by plowing or harrowing. The drill press is then used to plant the seeds in rows. A more recent variation of the conventional drill press method is to plant the seeds in ground which has been "minimum tilled".

The primary disadvantages of the conventional drill press seeding method are that it is time consuming and requires rather expensive equipment. A further disadvantage of the conventional drill press seeding method is that the soil becomes compacted due to wheel tracks and the like. Still another disadvantage of the conventional drill press method of seeding is that the equipment cannot be used when the ground is wet. Yet another disadvantage in the conventional drill press method is that one crop must be harvested before another crop can be seeded.

In an effort to provide an improved method of seeding, attempts have been made to seed or plant through a center pivot irrigation system. The use of a center pivot irrigation system to plant or seed eliminates the need for the equipment normally used to mechanically plant the field. In the February 1985 issue of the Deere and Co. publication entitled "The Furrow", it was reported that a single span center-pivot irrigation system had been used to plant corn some time during 1984 at the University of Georgia Coastal Plain Experimental Station in Tifton, Ga. The experiments at the University of Georgia experimental station at Tifton were also reported in the May 1985 issue of "Irrigation Age". In an article entitled "Far-Out Farming" in the Apr. 11, 1985 issue of "Machine Design", a suggestion was made that an irrigation rig could till, plant, irrigate and apply chemicals while unattended.

A problem associated with seeding through a center-pivot irrigation system which apparently has not been previously addressed is achieving uniform seed distribution. Inasmuch as a center-pivot irrigation system travels around a center-pivot, some method or means must be devised to ensure that the outer portions of the irrigation system, which are covering greater areas than the inner portions of the system, will apply the seeds at the same rate/acre as the inner portions of the system. A further problem associated with seeding through an irrigation system is efficiently conveying the seeds to the sprinklers on the system. A further complication is the fact that different types of seed are heavier than other types of seeds. A further consideration in seeding through an irrigation system is to prevent damage to the seed as it is being delivered to the sprinklers.

SUMMARY OF THE INVENTION

A means for seeding or planting through a self-propelled irrigation system is disclosed. The irrigation system is comprised of a primary water supply pipe which is supported on and moved by a plurality of spaced-apart drive towers. The The water supply pipe is in communication with a source of water under pressure so that the sprinklers on the water supply pipe may sprinkle irrigating water onto the ground beneath the system as the system is moved over a predetermined area. The means for seeding through the irrigation system comprises a water tank which is imposed between the source of water under pressure and an auxiliary water line mounted on the system. A plurality of spaced-apart sprinklers are mounted on the auxiliary water line and are controlled by sequentially operated valves fluidly connected thereto. In one form of the invention, a metering plate meters the seeds from a seed hopper into the water tank so that the seeds will be supplied to the sprinklers on the auxiliary water line. In another form of the invention, a screw conveyor meters the seeds from the seed hopper to the sprinklers on the auxiliary water line. In still another form of the invention, the seeds are pumped directly through the primary water supply line to sequentially operate sprinklers.

It is therefore a principal object of the invention to provide a means whereby seeds are broadcasted on the ground by means of a conventional center-pivot irrigation system.

A further object of the invention is to provide a means for seeding through an irrigation system which permits a second crop to be seeded prior to the first crop being harvested.

A further object of the invention is to provide a means for seeding which prevents soil compaction and which enables the seeding operation to be accomplished even though the field is too wet to permit a tractor to enter thereon.

Yet another object of the invention is to provide a means for seeding through a self-propelled irrigation system which eliminates the need for costly conventional planters and tractors.

Yet another object of the invention is to provide a means for seeding through a self-propelled irrigation system which enables the seeds to be broadcast onto the ground without the need for soil preparation.

Still another object of the invention is to provide a means for seeding through a self-propelled irrigation system wherein the seeds are substantially uniformly deposited onto the ground.

Still another object of the invention is to provide a means for seeding through a self-propelled irrigation system without damaging the seeds.

Still another object of the invention is to provide a means for modifying a conventional self-propelled irrigation system to enable the system to plant crops without expensive modification of the existing system.

Yet another object of the invention is to provide a method of planting seeds by means of a center-pivot irrigation system wherein the sprinklers thereon are sequentially controlled so that substantial uniform seed distribution is achieved.

Still another object of the invention is to provide a means for seeding through a self-propelled irrigation system which is reliable.

DESCRIPTION OF THE PREFERRED EMBODIMENT

Figure 1:
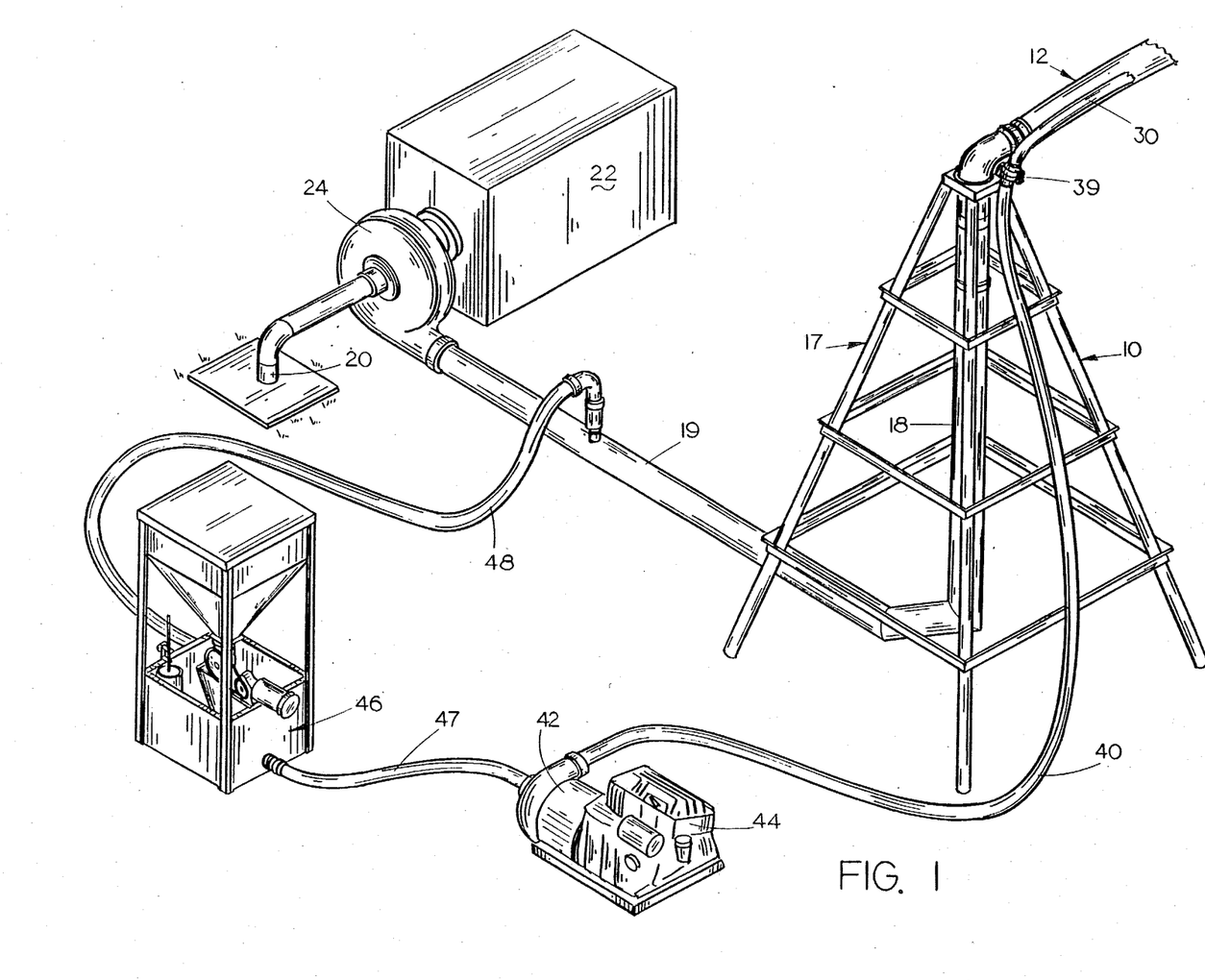
FIG. 1 is a perspective view of that part of the invention herein which is located at the center-pivot of the irrigation system.
Figure 2:
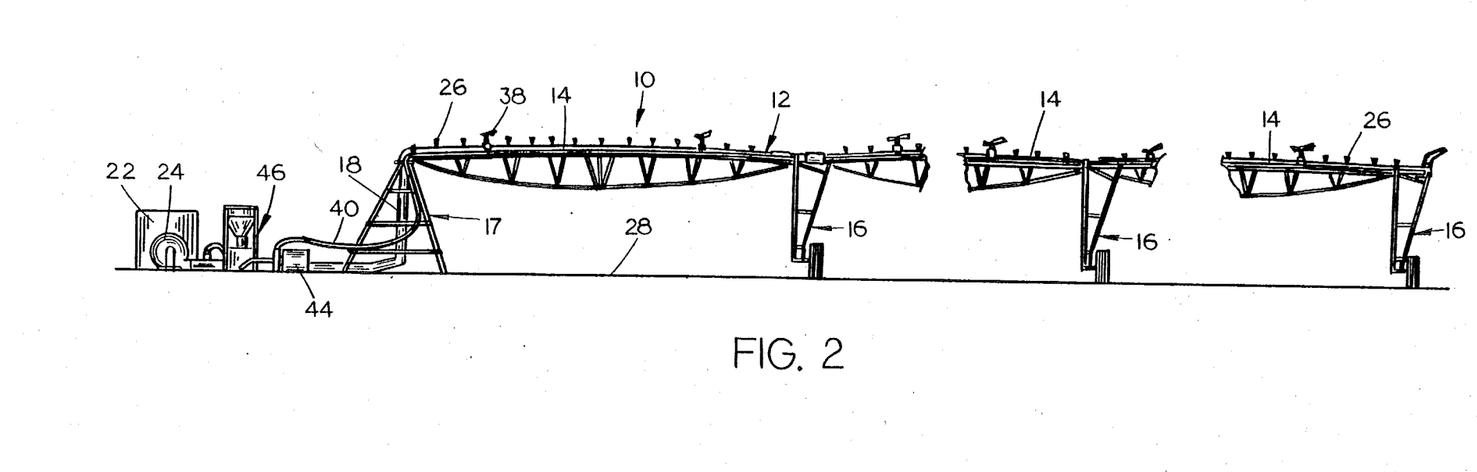
FIG. 2 is a partial side view of the system of this invention.
Figure 3:
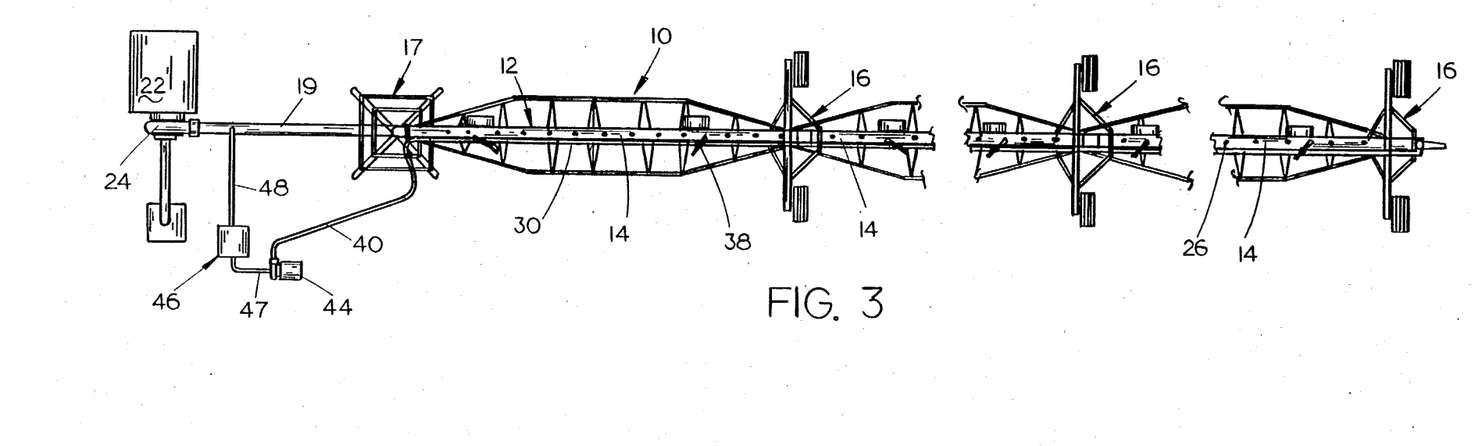
FIG. 3 is a partial top view of the system of this invention.

In FIGS. 1, 2 and 3, the numeral 10 refers to a typical center pivot irrigation system including a main water supply pipe 12 comprised of a plurality of pipe sections 14 joined together and supported by a plurality of drive towers 16. Pipe 12 extends outwardly from a center pivot structure 17 including pipe 18 which is connected to a well or water supply 20 or the like by pipe 19 as depicted in FIG. 1. Engine 22 operates pump 24 to supply water from the well 20 to the interior of the pipes 18, 19 and 12. A plurality of spaced-apart sprinklers 26 are provided on the pipe 12 for sprinkling irrigating water onto the ground 28. The drive towers 16 are propelled in conventional fashion so that the system revolves around the center pivot structure 17 to furnish irrigating water to the ground 28.

Figure 8:
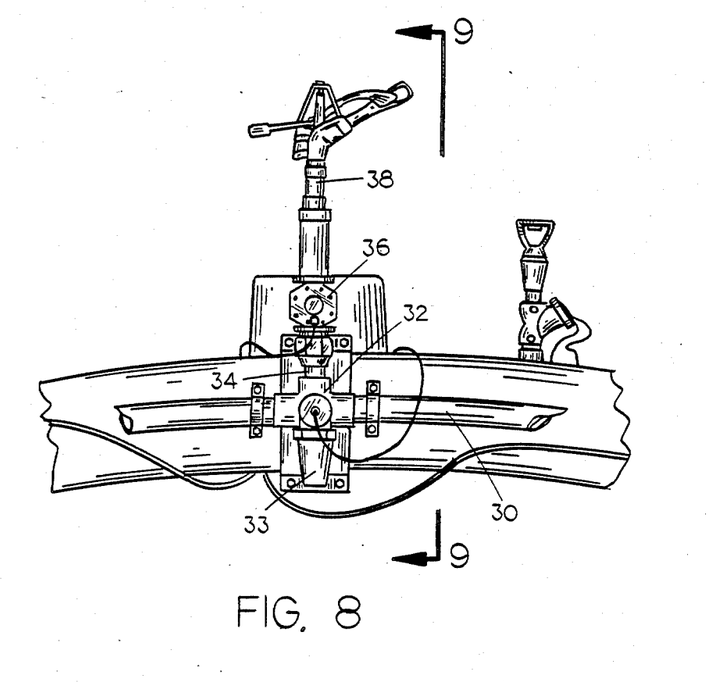
FIG. 8 is a partial side view of one of the sprinklers mounted on the auxiliary water line.
Figure 9:
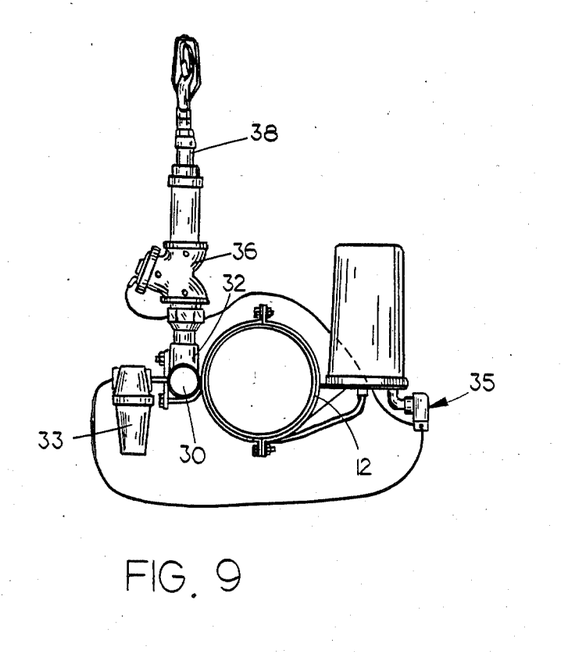
FIG. 9 is a sectional view seen on lines 9—9 of FIG. 8.

An auxiliary water line or pipe 30 is supported on the water supply pipe 12 and extends the length thereof. A plurality of tee-connections 32 are imposed in the auxiliary water line 30 as best seen in FIG. 8. Each of the connections 32 has a pipe 34 extending upwardly therefrom. A remotely operated valve 36 is mounted in the line 34 and has a sprinkler 38 extending upwardly therefrom. The valves 36 are electrically connected to a programmable controller to enable the sequential operation of the sprinklers 38 as disclosed in U.S. Pat. No. 3,901,442. A water filter 33 and solenoid valve 35 are also provided as seen in FIG. 8.

The inner end of auxiliary line 30 is connected by means of a quick coupler 39 to a water line 40 extending from pump 42 which is driven by engine 44. The inlet end of pump 42 is connected to a water tank 46 by means of hose 47 as will be described in more detail hereinafter. Water line 48 extends from line 19 and has a hydraulically operated valve 52 imposed therein.

A horizontally extending pipe 58 is positioned in tank 46 which is in fluid communication with the lower end of a tube 60. Pipe 58 is connected to hose 47 by means of coupler 59. Tube 60 is substantially funnel-shaped comprised of four flat sides 62, 64, 66 and 68. Each of the sides 62, 64, 66 and 68 is provided with an opening 70 formed therein which is offset from the central vertical axis of the tube 60 for a purpose to be described in more detail hereinafter. The lower end of tube 60 is provided with an inlet opening 72 which is adjustably selectively closed by an adjustable slide gate valve 74 to control the amount of water entering the lower end of tube 60.

Float valve assembly 75 is mounted in the interior of the tank 46 for controlling the operation of the hydraulically operated valve 52 to control the supply of water to the interior of the tank 46.

The numeral 76 refers to a seed hopper adapted to contain the seeds to be planted and which is positioned over the tank 46 and the tube 60 as illustrated in the drawings. The lower end of hopper 76 includes a discharge portion 78 having a seed metering plate means 80 rotatably mounted in the lower end thereof. Metering plate means 80 has a sprocket 82 connected thereto which is driven by a selectively adjustable gear motor assembly 84 through chain 85. The volume of seeds passing from the lower end of the hopper 76 into the tube 60 will depend upon the configuration of the metering plate 80 and the gearing of the sprocket 82 and/or the speed of gear motor 84.

Figure 7:
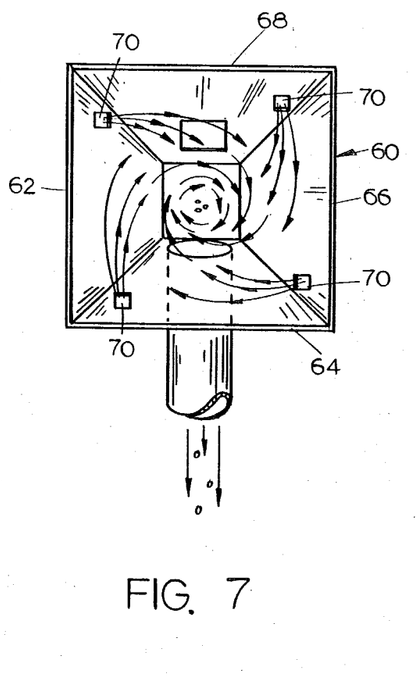
FIG. 7 is an enlarged sectional view seen on lines 7—7 of FIG. 6 with the straight arrows indicating the flow path of the water and seeds and the arcuate arrows indicating the vortex action created within the seed tube.

When it is desired to plant seeds through the irrigation system, the drive towers 16 are conventionally operated to propel the system around the center pivot. The sprinklers 26 are preferably operated during the seeding operation. Engine 22 is operated so that water is pumped from pump 24 into the line 48 and into the interior of the tank 46 through the valve 52. Float valve 76 maintains the desired level of water within the tank 46 to prevent the overflow of the tank. Pump 42 is operated by means of the motor 44 which draws the water outwardly from the tank 46 through the pipe 58. The water in the tank passes into the pipe 58 through the opening 72 and from the tube 60 due to the fact that water can enter the tube 60 through the offset openings 70. The offset openings 70 cause the water to swirl within the tube 60, as illustrated in Figure 7, so as to create a vortex action therein so that the seeds dropping into the tube 60 from the metering 80 will pass downwardly into the intake end of pipe 58. As previously stated, the metering plate 80 is rotated by means of the gear motor 84 so that the proper amount of seeds are dropped into the tube 60. The seeds are suspended in the water and pass through the auxiliary line 30 for discharge through the sprinklers 38. The sprinklers 38 are sequentially operated, as the drive towers 16 propel the system over the area to be planted, so that the seeds are substantially uniformly distributed over the area being planted. The sequential operation of the sprinklers 38 is necessary since additional seeds must be sprinkled onto the ground at the outer end of the system due to the greater area being covered at the outer end of the system. When the seeding operation has been completed, the seeds can be periodically watered by the irrigation system itself.

Figure 11:
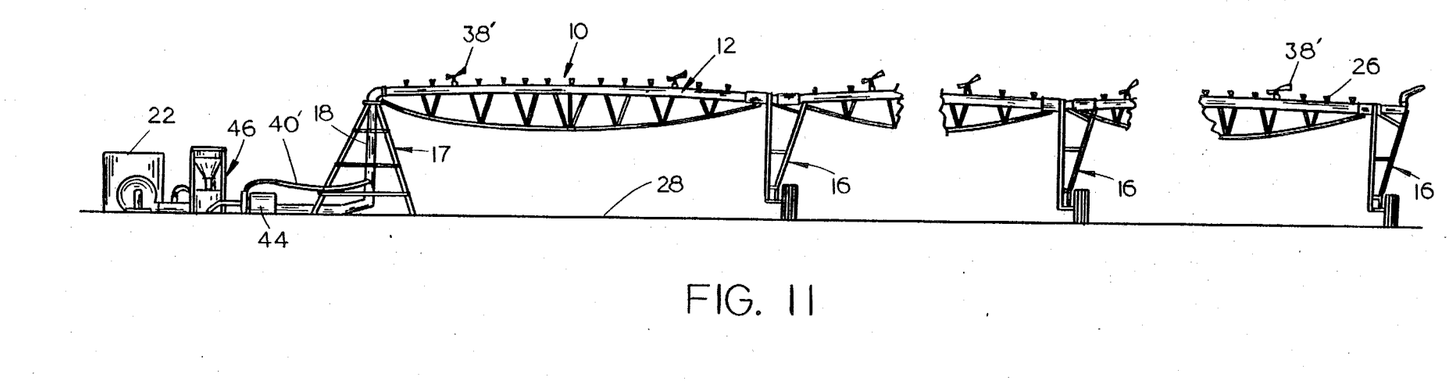
FIG. 11 is a partial side view similar to FIG. 2 but which illustrates a modified form of the invention.
Figure 12:
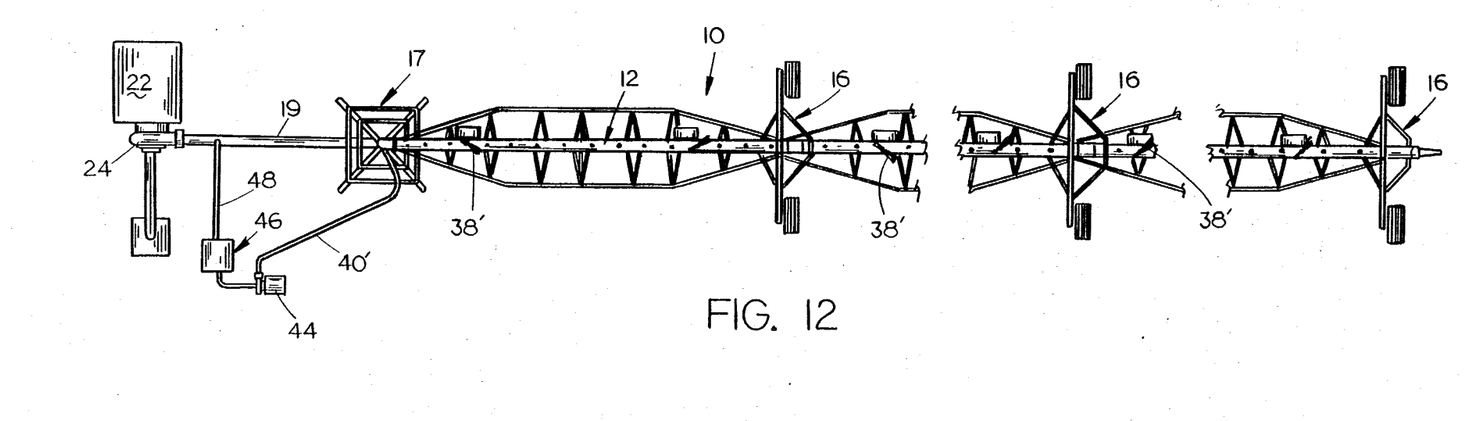
FIG. 12 is a partial top view of the embodiment of FIG. 11.

Although the embodiment just described is the preferred embodiment, the seeds may be planted through the main water supply pipe 12 such as illustrated in FIGS. 11 and 12 by connecting the hose 40' to the pipe 18 so that the seeds suspended in water and passing from the injection means will enter the interior of the main water supply pipe 12 rather than an auxiliary line. In such an embodiment, remotely controlled sprinklers 38' are mounted on the pipe 12 along the length thereof and are operated by a programmable controller to control the sequential operation thereof. Although the system illustrated in FIGS. 11 and 12 is also shown to include small sprinkler heads 26, such may be shut off while seeding or may not be required.

Figure 4:
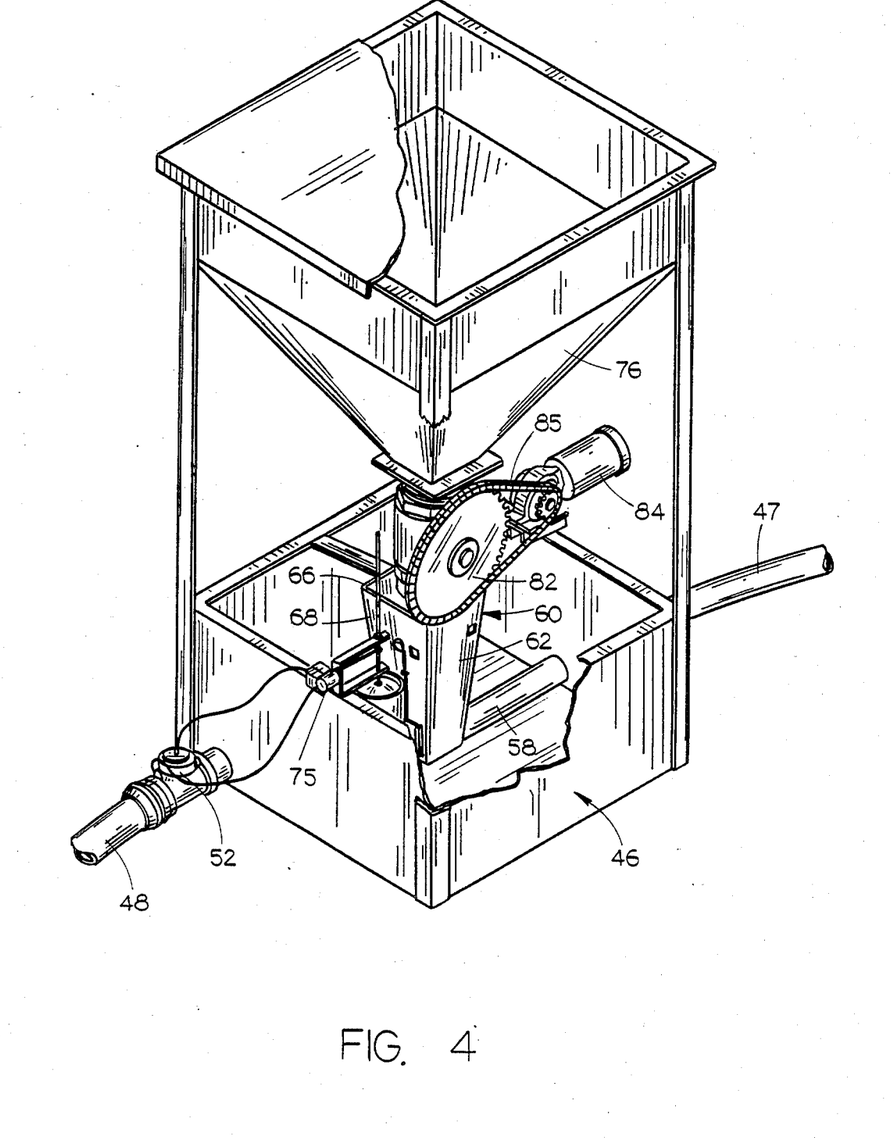
FIG. 4 is a perspective view of the seed hopper and injection means with portions thereof cut away to more fully illustrate the invention.
Figure 5:
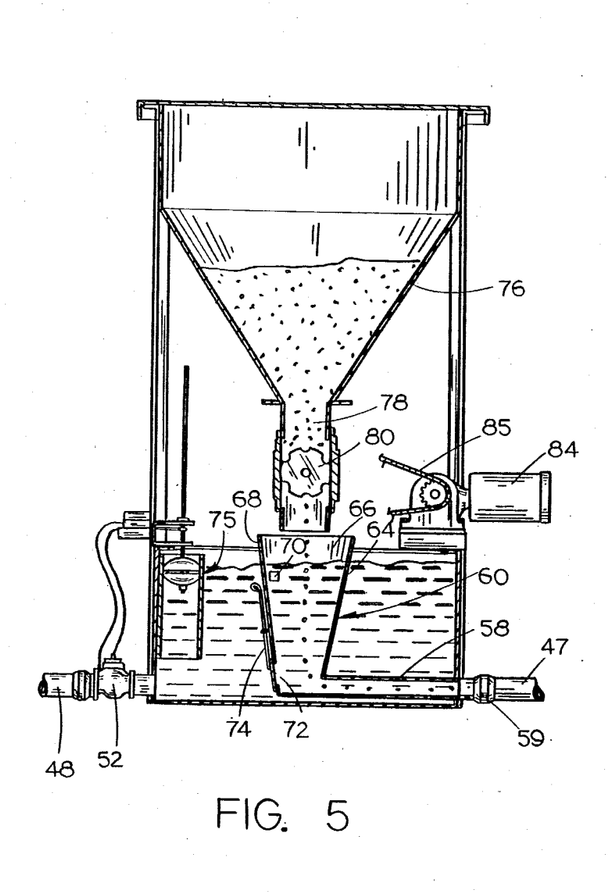
FIG. 5 is a vertical sectional view of the seed hopper and injection means of FIG. 4.
Figure 6:
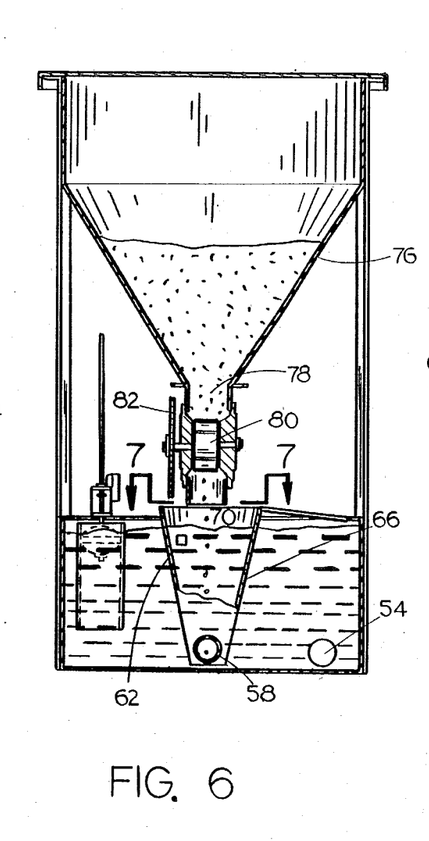
FIG. 6 is a sectional view of the seed hopper and injection means of FIG. 4 and at a 90° angle to that illustrated in FIG. 5.
Figure 10:
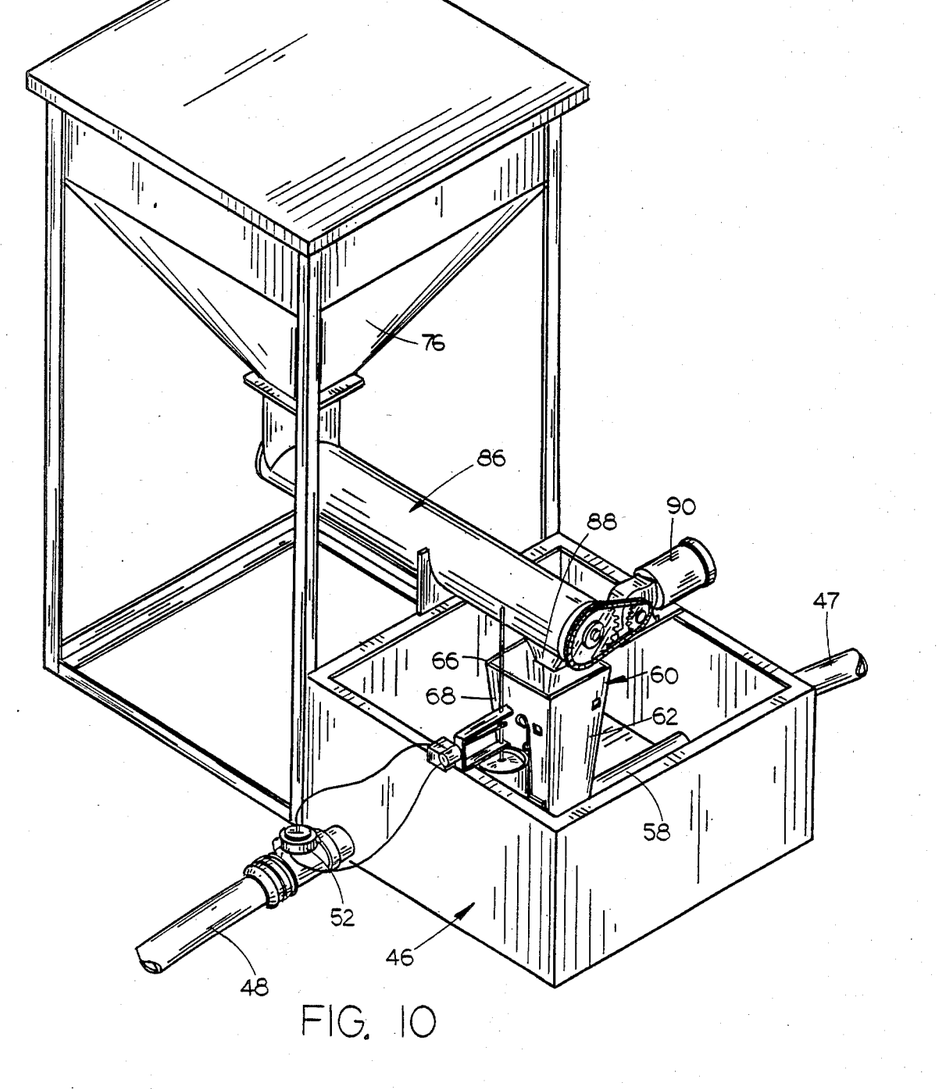
FIG. 10 is a perspective view similar to FIG. 4 but which illustrates a modified form of the injection means.

Although the injection system previously described and as best illustrated in FIG. 4 is the preferred injection system, the metering plate 80 and the gear motor for operating the same may be replaced by a screw auger conveyor 86 which has its inlet end connected to the lower end of the hopper 76 and its discharge end 88 positioned over the tube 60 as best illustrated in FIG. 10. Screw auger conveyor 86 is controlled by a variable speed gear motor 90 so that the proper amount of seed is fed to the upper end of the tube 60. As seen in FIG. 10, in such an injection system, the water tank 46 may be positioned laterally of the hopper 76.

The invention herein permits seeds to be planted through a self-propelled irrigation system without the necessity of requiring large equipment to plant the crop thereby eliminating costly labor and equipment expense. Inasmuch as the crop may be planted through the irrigation system, soil compaction is prevented. Perhaps the greatest advantage to the system described herein is that it permits "double cropping" or "intercropping". In other words, a second crop may be planted through the system before the first crop, which had been previously planted, has been harvested. The ability to plant the second crop before harvesting the first crop enables the second crop to be planted much earlier.

Although the means described herein is the preferred embodiment and is ideally suited for use with a center-pivot irrigation system, the means of this invention may also be used in combination with a linear move irrigation system.

Thus it can be seen that the invention accomplishes at least all of its stated objectives.

We claim:

1. In combination,
    a self-propelled irrigation system comprising a primary water supply pipe supported by a plurality of spaced-apart drive towers adapted to move said primary water supply pipe over a predetermined area,
    said primary water supply pipe being in operative communication with a source of water,
    a plurality of spaced-apart first sprinklers on said primary water supply pipe for sprinkling water on said predetermined area as said primary water supply pipe is moved thereover,
    means for pumping water through said primary water supply pipe to said first sprinklers,
    an auxiliary water line means supported on said irrigation system and being in operative communication with a source of water under pressure,
    means for pumping water through said auxiliary water line means,
    said auxiliary water line means extending for substantially the entire length of said primary water supply pipe,
    a plurality of spaced-apart second sprinklers on said auxiliary water line means for sprinkling the water in said auxiliary water line means on said predetermined area as said primary water supply pipe and said auxiliary water line means are moved over said predetermined area,
    an actuator means operatively connected to each of said second sprinklers for actuating said second sprinklers at times,
    a seed supply means adapted to supply seeds to be planted,
    metering means in operative communication with said seed supply means and said auxiliary water line means for metering seeds from said seed supply means, at a predetermined rate, into the water passing through said auxiliary water line means whereby the seeds will be conveyed to said second sprinklers,
    and control means operatively connected to said actuator means for selectively controlling said actuator means whereby the said second sprinklers will be selectively operated to sprinkle water and seeds therefrom, to achieve substantially uniform seed distribution on said predetermined area along the length of said auxiliary water line means as said primary water supply pipe and said auxiliary water line means are moved over said predetermined area.

2. The combination of claim 1 wherein said self-propelled irrigation system is of the center-pivot type and wherein said primary water supply pipe extends outwardly from a center-pivot.

3. The combination of claim 1 wherein said metering means includes a water tank means adapted to receive seeds from said seed supply means, said water tank means comprising a bottom wall with upstanding side walls, a vertically disposed hollow tube means positioned in said water tank means and having an open upper end which is in communication with said metering means so that the seeds are delivered to the interior of said tube means, said water tank means having a water inlet means in communication with a source of water under pressure whereby water will be supplied to the interior of said tank means, means for controlling the level of water in said water tank means, said tube means being in fluid communication with the water in said tank means, said tube means also being in fluid communication with said auxiliary water line means whereby said seeds delivered to said tube means will be supplied to said sprinklers on said auxiliary water line means.

4. The combination of claim 3 wherein said metering means is positioned below said seed supply means and above said tube means.

5. The combination of claim 3 wherein said metering means comprises a screw auger conveyor means having an inlet end and a discharge end, said inlet end being in operative communication with said seed supply means, said discharge end being in operative communication with the upper end of said tube means.

6. The combination of claim 5 wherein said screw auger conveyor means is powered by a variable speed motor.

7. The combination of claim 1 wherein said first sprinklers on said primary water supply pipe may be operated independently of said second sprinklers on said auxiliary water line means.

8. The combination of claim 1 wherein said self-propelled irrigation system is a linear-move irrigation system.

9. The combination of claim 1 wherein said actuator means is electrically controlled and wherein said means for controlling the operation of said actuator means comprises a programmable controller means for sequencing said second sprinklers on said auxiliary water line means.

10. In combination,
a self-propelled irrigation system comprising a primary water supply pipe supported by a plurality of spaced-apart drive towers adapted to move said primary water supply pipe over a predetermined area,
said primary water supply pipe being in operative communication with a source of water,
a plurality of spaced-apart first sprinklers on said primary water supply pipe for sprinkling water on said predetermined area as said primary water supply pipe is moved thereover,
means for pumping water through said primary water supply pipe to said first sprinklers,
an actuator means operatively connected to each of said first sprinklers,
a seed supply means adapted to supply seeds to be planted,
metering means in operative communication with said seed supply means and said primary water supply pipe for metering seeds from said seed supply means, at a predetermined rate, into the water passing through said primary water supply pipe whereby the seeds to be planted will be conveyed to said first sprinklers,
and control means operatively connected to said actuator means for selectively controlling said actuator means whereby said first sprinklers will be selectively operated to sprinkle water and seeds therefrom, as said primary water supply pipe is moved over said predetermined area, to achieve substantially uniform seed distribution on said predetermined area along the length of said primary water supply pipe.

11. The combination of claim 10 wherein said self-propelled irrigation system is of the center-pivot type wherein said primary water supply pipe extends radially outwardly from a center-pivot point.

12. The combination of claim 10 wherein said means for controlling said sprinklers on said auxiliary water line means comprises a sequencing means for selectively operating each of said sprinklers for a predetermined length of time.

13. The combination of claim 10 wherein said metering means includes a water tank means adapted to receive seeds from said seed supply means, said water tank means comprising a bottom wall with upstanding side walls, a vertically disposed hollow tube means positioned in said water tank means having an open upper end which is in communication with said metering means so that the seeds are delivered to the interior of said tube means, said water tank means having a water inlet means in communication with a source of water under pressure whereby water will be supplied to the interior of said tank means, means for controlling the level of water in said water tank means, said tube means being in fluid communication with the water in said tank means, said tube means also being in fluid communication with said auxiliary water line means whereby said seeds delivered to said tube means will be supplied to said sprinklers on said auxiliary water line means.

14. The combination of claim 13 wherein said metering means including a screw auger conveyor means having an inlet end and a discharge end, said inlet end being in operative communication with said seed supply means, said discharge end being in operative communication with the upper end of said tube means.

15. The combination of claim 14 wherein said screw auger conveyor means is powered by a variable speed motor.

16. The combination of claim 10 wherein said self-propelled irrigation system is a linear-move irrigation system.

17. A self-propelled irrigation system comprising,
a primary water supply pipe supported by a plurality of spaced-apart drive towers adapted to move said primary water supply pipe over a predetermined area,
said primary water supply pipe being in operative communication with a source of water,
a plurality of spaced-apart first sprinklers on said primary water supply pipe for sprinkling water on said predetermined area as said primary water supply pipe is moved thereover,
means for pumping water through said primary water supply pipe to said first sprinklers,
an auxiliary water line means supported on said irrigation system and being in operative communication with a source of water under pressure,
means for pumping water through said auxiliary water line means,
said auxiliary water line means extending for substantially the entire length of said primary water supply pipe,
a plurality of spaced-apart second sprinklers on said auxiliary water line means for sprinkling the water in said auxiliary water line means on said predetermined area as said primary water supply pipe and said auxiliary water line means are moved over said predetermined area,
an actuator means operatively connected to each of said second sprinklers for actuating said second sprinklers at times,
a seed supply means adapted to supply seeds to be planted,
metering means in operative communication with said seed supply means and said auxiliary water line means for metering seeds from said seed supply means, at a predetermined rate, into the water passing through said auxiliary water line means whereby the seeds will be conveyed to said second sprinklers,
and control means operatively connected to said actuator means for selectively controlling said actuator means whereby the said second sprinklers will be selectively operated to sprinkle water and seeds therefrom, to achieve substantially uniform seed distribution on said predetermined area along the length of said auxiliary water line means as said primary water supply pipe and said auxiliary water line means are moved over said predetermined area, said metering means including a water tank means adapted to receive seeds from said seed supply means, said water tank means comprising a bottom wall with upstanding side walls, a vertically disposed hollow tube means positioned in said water tank means and having an open upper end which is in communication with said metering means so that the seeds are delivered to the interior of said tube means, said water tank means having a water inlet means in communication with a source of water under pressure whereby water will be supplied to the interior of said tank means, means for controlling the level of water in said water tank means, said tube means being in fluid communication with the water in said tank means, said tube means also being in fluid communication with said auxiliary water line means whereby said seeds delivered to said tube means will be supplied to said sprinklers on said auxiliary water line means, said tube means having openings formed therein below its upper end in communication with the water in said water tank means so that water in said water tank means may enter said tube means.

18. The combination of claim 17 wherein said openings are offset from the longitudinal axis of said tube means to create a vortex effect in said tube means.

19. In combination, a self-propelled irrigation system comprising a primary water supply pipe supported by a plurality of spaced-apart drive towers adapted to move said primary water supply pipe over a predetermined area, said primary water supply pipe being in operative communication with a source of water, a plurality of spaced-apart first sprinklers on said primary water supply pipe for sprinkling water on said predetermined area as said primary water supply pipe is moved thereover, means for pumping water through said primary water supply pipe to said first sprinklers, an actuator means operatively connected to each of said first sprinklers, a seed supply means adapted to supply seeds to be planted, metering means in operative communication with said seed supply means and said primary water supply pipe for metering seeds from said seed supply means, at a predetermined rate, into the water passing through said primary water supply pipe whereby the seeds to be planted will be conveyed to said first sprinklers, and control means operatively connected to said actuator means for selectively controlling said actuator means whereby said first sprinklers will be selectively operated to sprinkle water and seeds therefrom, as said primary water supply pipe is moved over said predetermined area, to achieve substantially uniform seed distribution on said predetermined area along the length of said primary water supply pipe, said metering means including a water tank means adapted to receive seeds from said seed supply means, said water tank means comprising a bottom wall with upstanding side walls, a vertically disposed hollow tube means positioned in said water tank means and having an open upper end which is in communication with said metering means so that the seeds are delivered to the interior of said tube means, said water tank means having a water inlet means in communication with a source of water under pressure whereby water will be supplied to the interior of said tank means, means for controlling the level of water in said water tank means, said tube means being in fluid communication with the water in said tank means, said tube means also being in fluid communication with said auxiliary water line means whereby said seeds delivered to said tube means will be supplied to said sprinklers on said auxiliary water line means, said tube means having openings formed therein below its upper end in communication with the water in said water tank means so that water in said water tank means may enter said tube means, said water supply pipe being in communication with said tube means below said openings.

20. The combination of claim 19 wherein said openings are offset from the longitudinal axis of said tube means to create a vortex effect in said tube means.

* * * * *